United States Patent
Kabbani et al.

(10) Patent No.: US 9,166,886 B1
(45) Date of Patent: Oct. 20, 2015

(54) SYSTEMS AND METHODS FOR DETERMINING PHYSICAL NETWORK TOPOLOGY

(71) Applicant: Google Inc., Mountain View, CA (US)

(72) Inventors: Abdul Kabbani, Los Gatos, CA (US); Amin Vahdat, Los Altos, CA (US)

(73) Assignee: Google Inc., Mountain View, CA (US)

(*) Notice: Subject to any disclaimer, the term of this patent is extended or adjusted under 35 U.S.C. 154(b) by 174 days.

(21) Appl. No.: 13/921,871

(22) Filed: Jun. 19, 2013

(51) Int. Cl.
*H04L 12/24* (2006.01)
*H04L 12/947* (2013.01)
*H04L 12/933* (2013.01)
*H04L 12/721* (2013.01)

(52) U.S. Cl.
CPC ............... *H04L 41/12* (2013.01); *H04L 49/25* (2013.01); *H04L 45/12* (2013.01); *H04L 49/1515* (2013.01)

(58) Field of Classification Search
None
See application file for complete search history.

(56) References Cited

U.S. PATENT DOCUMENTS

| | | | |
|---|---|---|---|
| 1,856,853 A | 5/1932 | Potdevin | |
| 5,528,584 A | 6/1996 | Grant et al. | |
| 8,370,496 B1 | 2/2013 | Marr | |
| 8,392,575 B1 | 3/2013 | Marr | |
| 2004/0078179 A1* | 4/2004 | Fuji et al. | 703/15 |
| 2007/0206763 A1* | 9/2007 | Chandra et al. | 379/220.01 |
| 2008/0089333 A1 | 4/2008 | Kozat et al. | |
| 2010/0150147 A1* | 6/2010 | Khanduri | 370/388 |
| 2010/0208623 A1* | 8/2010 | Kano | 370/258 |
| 2011/0119390 A1 | 5/2011 | Leech et al. | |
| 2012/0307631 A1 | 12/2012 | Yang et al. | |

FOREIGN PATENT DOCUMENTS

| | | |
|---|---|---|
| EP | 1 001 351 | 5/2000 |
| EP | 1 062 741 | 10/2004 |
| EP | 1 620 976 | 2/2006 |
| EP | 1856853 | 1/2010 |
| EP | 1 949 622 | 3/2010 |
| WO | WO2004102983 | 11/2004 |
| WO | WO-2011/113582 | 9/2011 |

* cited by examiner

*Primary Examiner* — Kodzovi Acolatse
(74) *Attorney, Agent, or Firm* — Edward A. Gordon; Foley & Lardner LLP (57) ABSTRACT

A system determines a physical topology of a network including a plurality of nodes. Each node includes a multi-chip higher-tier switch, and each chip in the multi-chip higher-tier switch includes a plurality of ports. A network configuration module is configured to assign physical connections to respective ports of chips of the higher-tier switches through an iterative process. The iterative process includes selecting a first route of a plurality of routes, assigning for the source node of the selected route, a first port on a first chip having an odd number of free ports. For at least one intermediate node of the selected route, second and third ports on a second chip having an even number of free ports are assigned. For a destination port for the selected route, a fourth port on a third chip having an odd number of free ports is assigned.

20 Claims, 6 Drawing Sheets

SYSTEMS AND METHODS FOR DETERMINING PHYSICAL NETWORK TOPOLOGY

FIELD OF THE INVENTION

The present disclosure relates generally to systems and methods for determining a physical topology for a network.

BACKGROUND

Networks include elements such as nodes that are connected according to an arrangement. A topology of a network corresponds to an arrangement of the various elements of the network. In a data center, a network topology may include superblocks made of hundreds or thousands of servers connected to switches. An interconnected hierarchy of multiple switches can be provided within and between each superblock.

SUMMARY

According to one aspect, a system for determining a physical topology of a network that includes a plurality of nodes is disclosed. Each node includes a multi-chip higher-tier switch, and each chip in the multi-chip higher-tier switch includes a plurality of ports. The system further includes a network configuration module configured to assign physical connections to respective ports of chips of the higher-tier switches through an iterative process. The iterative process includes selecting a first route of a plurality of routes. The selected route includes a source node, at least one intermediate node, and a destination node. The iterative process further includes assigning for the source node for the selected route, a first port on a first chip having an odd number of free ports. For the intermediate node for the selected route, the iterative process includes assigning second and third ports on a second chip having an even number of free ports. For the destination port for the selected route, the iterative process includes assigning a fourth port on a third chip having an odd number of free ports.

In a further aspect, a computer-implemented method for determining a physical topology of a network is disclosed. The network includes a plurality of network nodes, each including a multi-chip higher-tier switch having a plurality of ports. The method further includes assigning physical connections for respective ports of chips of the higher-tier switches of the nodes through an iterative process. The iterative process includes selecting a first route of a plurality of routes. The selected route includes a source node, at least one intermediate node, and a destination node. The iterative process includes, for the source node, assigning for the selected route a first port on a first chip having an odd number of free ports; for the at least one intermediate node, assigning for the selected route second and third ports on a second chip having an even number of free ports; and, for the destination node, assigning for the selected route a fourth port on a third chip having an odd number of free ports.

In another aspect, a computer-readable storage medium having instructions stored therein is disclosed. The instructions, when executed by a processor, cause the processor to carry out a set of operations for determining a physical topology of a network that includes a plurality of network nodes, each including a multi-chip higher-tier switch having a plurality of ports. The operations include assigning physical connections for respective ports of chips of the higher-tier switches of the nodes through an iterative process. The iterative process includes selecting a first route of a plurality of routes. The selected route includes a source node, at least one intermediate node, and a destination node. The iterative process includes, for the source node, assigning for the selected route a first port on a first chip having an odd number of free ports; for the at least one intermediate node, assigning for the selected route second and third ports on a second chip having an even number of free ports; and, for the destination node, assigning for the selected route a fourth port on a third chip having an odd number of free ports.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and form a part of this specification.

BRIEF DESCRIPTION OF THE DRAWINGS

The details of one or more implementations of the subject matter described in this specification are set forth in the accompanying drawings and the description below. Other features, aspects, and advantages of the subject matter will become apparent from the description, the drawings, and the claims.

Like reference numbers and designations in the various drawings indicate like elements.

DETAILED DESCRIPTION

The various concepts introduced above and discussed in greater detail below may be implemented in any of numerous ways, as the described concepts are not limited to any particular manner of implementation. Examples of specific implementations and applications are provided primarily for illustrative purposes.

The present disclosure describes systems, methods and computer-readable media determining a physical topology for a computer network. As used herein, the physical topology of a network refers to arrangement of physical communication links between nodes in a network. Such communication links can be optical links, wired electrical links, radio links, or any other form of a physical layer connection. In some implementations, each node is associated with a switch having a number of communication ports. Generally, the switch receives data over one link at a first port, identifies a second port corresponding to a second link to output the data, and outputs the data over the second link via the second port. Accordingly, one aspect of a network's physical topology is the link/port correspondence at each switch.

Figure 1:
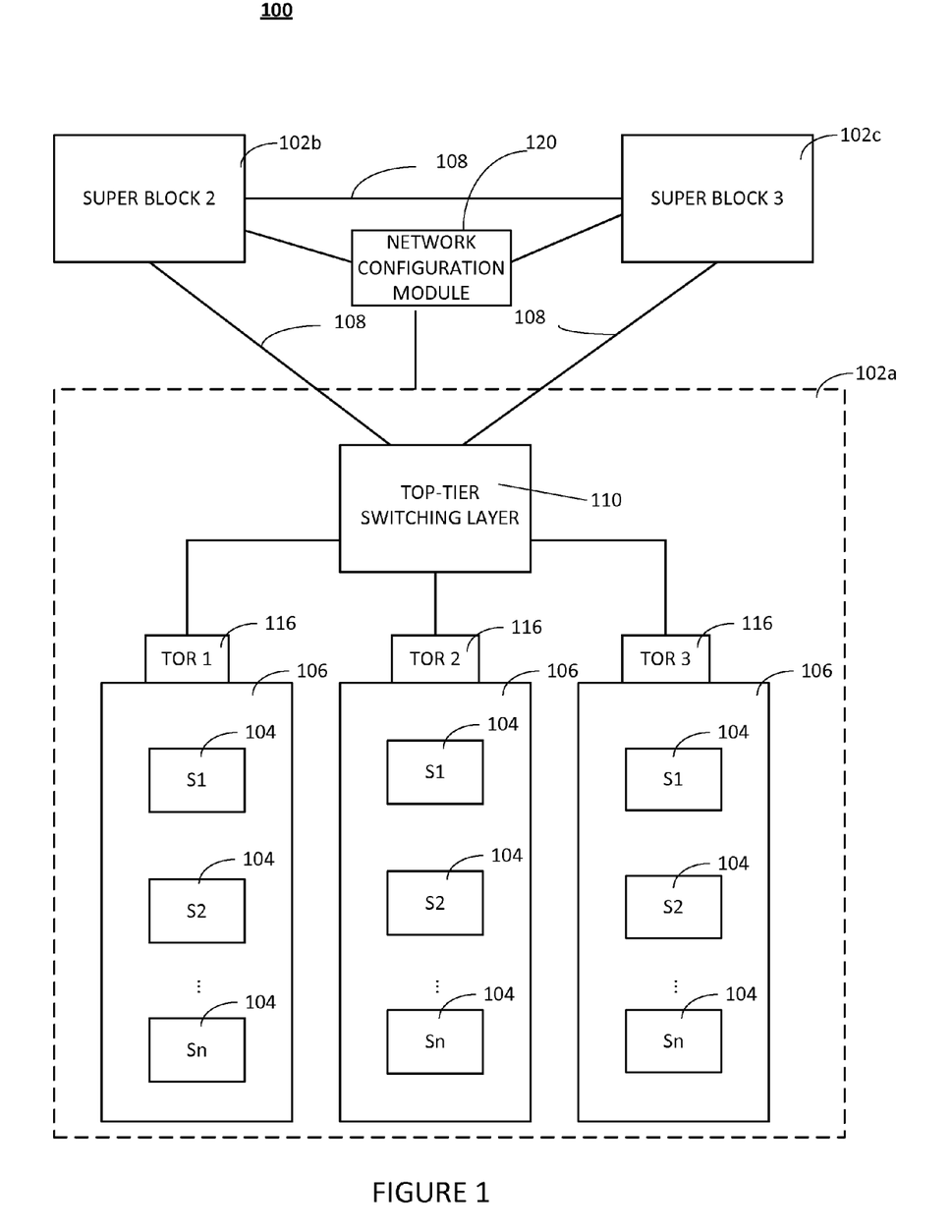
FIG. 1 is a block diagram of an example data center.

FIG. 1 is a block diagram of an example data center 100. The data center 100 includes several interconnected superblocks 102a-102c (generally superblocks 102). Each superblock 102 includes on the order of several hundred to more than one thousand servers 104 arranged in server racks 106.

The server racks 106 and servers 104 are connected to one another via a hierarchy of switches. For example, each server rack 106 includes a top-of-rack ("TOR") switch 116 for handling data communications into and out of a given server rack 106. The superblocks 102 are communicatively coupled to one another by optical and/or electrical communication links 108 coupled to a switching layer 110 located at the top of the respective superblock's switching hierarchy. The switches included in these top-tier switch layers are referred to herein as top-tier switches. While for illustrative purposes the example data center 100 only depicts two layers of switches (i.e., the top-of-rack switches 116 and the top-tier switching layer 110), in some implementations, a data center may include one or more addition layers of switches in its switching hierarchy, for example, between the top-of-rack switches 116 and the top-tier switching layer 110 and/or below the top-of rack switches 116 in a given server rack 106.

In some data centers, given the large number of switches used to form the switching hierarchy, each tier of switches is formed from multiple, lower-cost Commercial-Off-the-Shelf ("COTS") switches, referred to as "chips." Individual chips tend to have fewer ports than desired for even the top-tier switches. Accordingly, in a given superblock 102, the top-tier switching layer is formed from multiple chips coupled by switches in a lower layer of the switching hierarchy. The switches in this lower layer are referred to herein as lower-tier switches.

In general, the amount of time it takes for a data communication, such as a packet, to traverse a route from a source node to a destination node increases as the number of switches through which the communication passes along the route increases. Accordingly, to increase the efficiency of a computer network, it is desirable to provide communication routes between nodes that involve fewer switches, and in some cases as few switches as possible.

In the context of a data center, such as the data center 100, packets are often routed from one server 104 in a first superblock 102 to a server 104 in a second superblock 102. In many cases, the packets cannot be routed directly from the first superblock 102 to the second superblock 102. Instead, the packets are passed through one or more intermediate superblocks as they are routed from the first superblock 102 to the second superblock 102. Ideally, to minimize the number of switches the packet must pass through along its route, the packet would be received and retransmitted by the same chip in the top-tier switching layer of the intermediate superblocks. If a packet cannot be received and transmitted by the same chip, given the typical hierarchical structure of data center networks, the packet be passed from a receiving top-tier chip down to a chip in a lower-tier switching layer, which would then pass the packet back to another top-tier chip capable of forwarding the packet to the next superblock along its route. This can significantly increase the amount of time it takes for a packet to pass through an intermediate superblock.

Figure 2A:
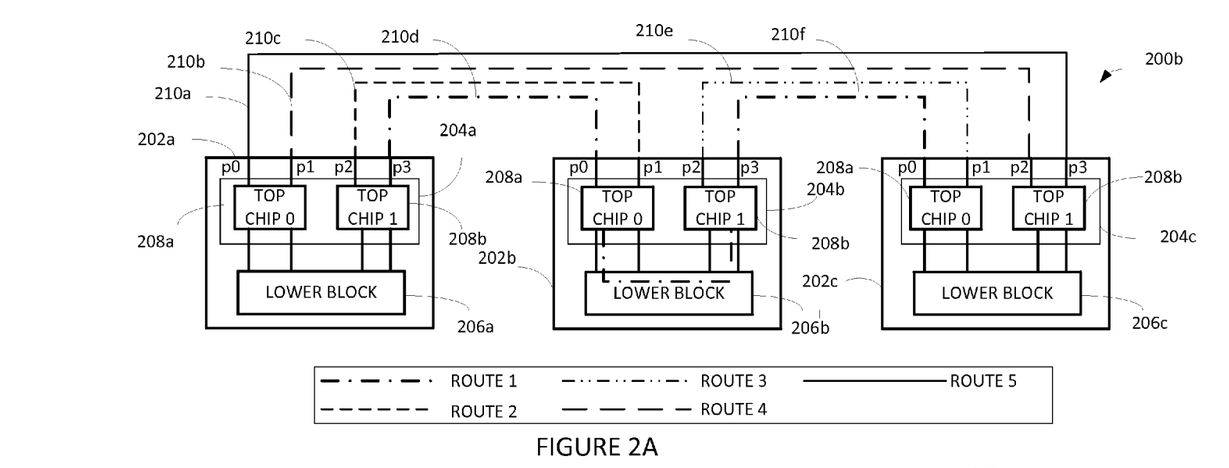
FIGS. 2A and 2B show two example physical topologies for a data center, such as the data center shown in FIG. 1.
Figure 2B:
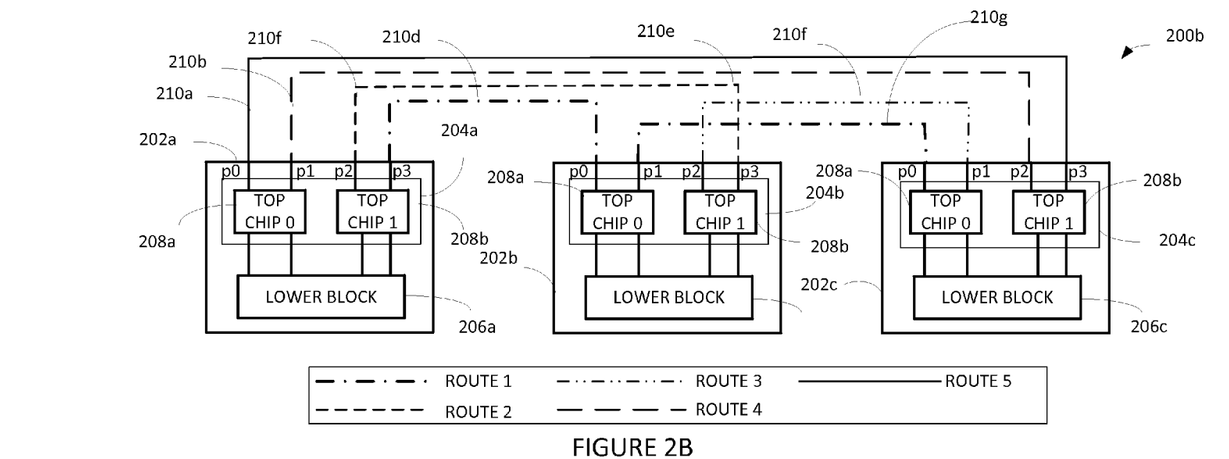

FIGS. 2A and 2B show two example physical topologies 200a and 200b for a data center, such as the data center 100 shown in FIG. 1. The physical topology 200a is less efficient than the physical topology 200b, as described further below.

Both physical topologies include three superblocks, superblocks 202a, 202b, and 202c (generally superblocks 202). Each superblock includes a respective upper-tier switching layer 204a, 204b, or 204c (generally upper-tier switching layers 204) and a lower-tier switching layer 206a, 206b, or 206c (generally lower-tier switching layers 206). The upper-tier switching layers 204 of each superblock 202 includes two chips, top chip 0 208a and top chip 1 208b (generally top chips 208). Each top chip 208 includes two ports. In some implementations, the top chips 208 include more than two ports. Typically, chips used in data centers have $2^n$, (e.g., 8, 16, 32, etc.) ports. In some implementations, each top chip 208 has the same number of ports. In some other implementations, the top chips have differing numbers of ports. The ports of these top chips 208 in each superblock 202 are labeled in FIGS. 2A and 2B as ports p0, p1, p2, and p3. The ports p0-p3 of the top tier chips 208 in different superblocks 202 are connected by respective physical links 210a-210f (generally physical links 210). Each physical link corresponds to one or more routes via which packets flow through the data center. As shown in FIG. 2A, it is assumed that each individual physical link 210 corresponds to a single route. However, as described further below, multiple routes can be assigned to one or more of the physical links 210, depending on the capacities of the physical links 210 and the bandwidth requirements of the respective routes.

As indicated above, the network topology 200a shown in FIG. 2A is less efficient than the network topology 200b of FIG. 2B. The inefficiency results from the routing of Route 4 from the first superblock 202a to the third superblock 202c through the second superblock 202b. More particularly, the as shown in FIG. 2A, Route 1 begins at port p3 of top tier chip 1 208b of the first superblock 2020a. Port p3 of the first superblock 202a is coupled to the second superblock via port p0 of the second superblock 202b. Port p0 of the second superblock 202b is included in top tier chip 0 208a of the second superblock 202b. Top tier chip 0 208a, lacks a port that is physically connected to the third superblock 202c. Thus, in order for a packet to be transmitted further along its Route 4 to the third superblock 202c, top tier chip 0 208a passes the packet down to the lower-tier switching layer 206b of the second superblock 202b. The lower-tier switching layer 206b then passes the packet up to top chip 1 208b of the upper-tier switching layer 204b, which includes a port p3 assigned to a physical connection 210f with the third superblock 202c.

In contrast, the physical topology 200b shown in FIG. 2B provides physical connections 210 between the superblocks 202a-202c, which allow for the transmission of data along all routes without packets needing to be passed to chips in the lower-tier switching layers 206 of any of the superblocks 202. More particularly, the physical topology 200b retains the physical connections 210a, 210b, 210d, and 210e replaces the physical connections 210c and 210f with physical connections 210g-210h. As a result, instead of being supported by physical connections 210d and 210f, which couple to the second superblock 202b at different top chips 208, Route 1 is supported by physical connections 210d and 210g, both of which couple to the second superblock 202b at the same top chip, top chip 0 208b.

Referring back to FIG. 1, in order for the data center to obtain an efficient physical topology, the data center 100 includes a network configuration module 120. The network configuration module 120 can be implemented as a standalone computing device, or it can be implemented on one of the servers 104 included in the data center 100. The network configuration module 120 can be implemented either entirely in hardware, or as a combination of hardware and software. For example, the network configuration module 120 can be implemented as computer readable instructions stored on a tangible computer readable medium. When the computer executable instructions are executed by a processor, the instructions cause the processor to carry out the functionality described further below and in relation to FIGS. 3-5D pertaining to the determination of a physical topology for the data center 100.

In general, the network configuration module 120 receives a routing matrix that identifies a set of routes that the physical topology of the data center network is to accommodate. The routing matrix identifies a series of paths from source superblocks to destination superblocks, including any intermediate superblocks along the way. The routing matrix can also identify the bandwidth demands of each route, the length of the route, and any priority information, e.g., quality of services parameters, associated with the route. The network configuration module 120 processes the routing matrix as described further below and outputs a topology matrix that indicates for each top tier chip in each superblock 102, the set of top tier chips of the other superblocks 102 to which it is to connect. For data centers including dynamic switches, the topology matrix can be output directly to the dynamic switches, which are configured to adjust their port assignments in accordance with the topology matrix. In some other implementations that lack such dynamic switches, the topology matrix can be output to network administrators who can then arrange for the manual re-cabling a reconfiguring of the physical connections in the data center in accordance with the topology matrix.

Figure 3:
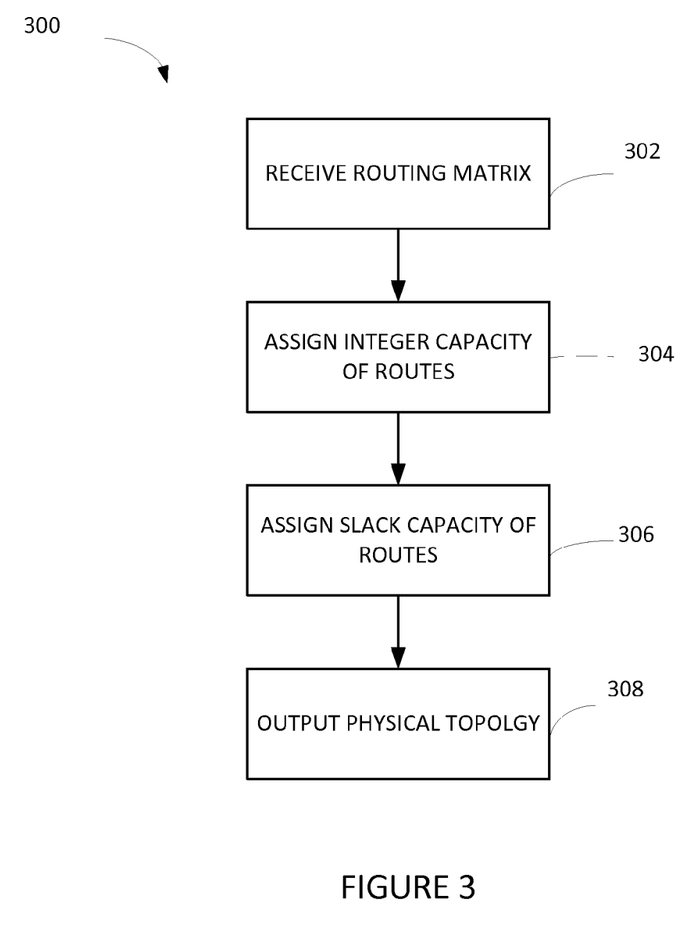
FIG. 3 is a flow diagram of an example method of determining a network physical topology.

FIG. 3 is a flow diagram of an example method of determining a network physical topology 300. In brief overview, the method 300 includes receiving a routing matrix (stage 302), assigning integer route capacities to top-tier chips (stage 304), assigning slack route capacities to top-tier chips (stage 306), and outputting a physical topology (stage 308).

As indicated above, the method 300 begins with receiving a routing matrix (stage 302). As described above, the routing matrix includes a set of routes for the data center network to accommodate. The routes indicate a source superblock, a destination superblock, and all intermediate superblocks packets following the route traverse between the source superblock and the destination superblock. The routing matrix may also include a separate route length value, which can be equal to the number of network hops included in the route, as well as priority parameters, such as quality of service parameters or the like.

Once the routing matrix is received, the method 300 includes assigning integer capacity routes to top-tier chips in the data center network (stage 304). As used herein, an integer capacity route refers to a route which utilizes the full capacity of the physical links along the route. Accordingly, if an integer capacity route is assigned to a physical connection, that physical connection will have no, or substantially no, additional capacity to transmit data for other routes that might include the pair of superblocks connected by the physical connection.

Figure 4:
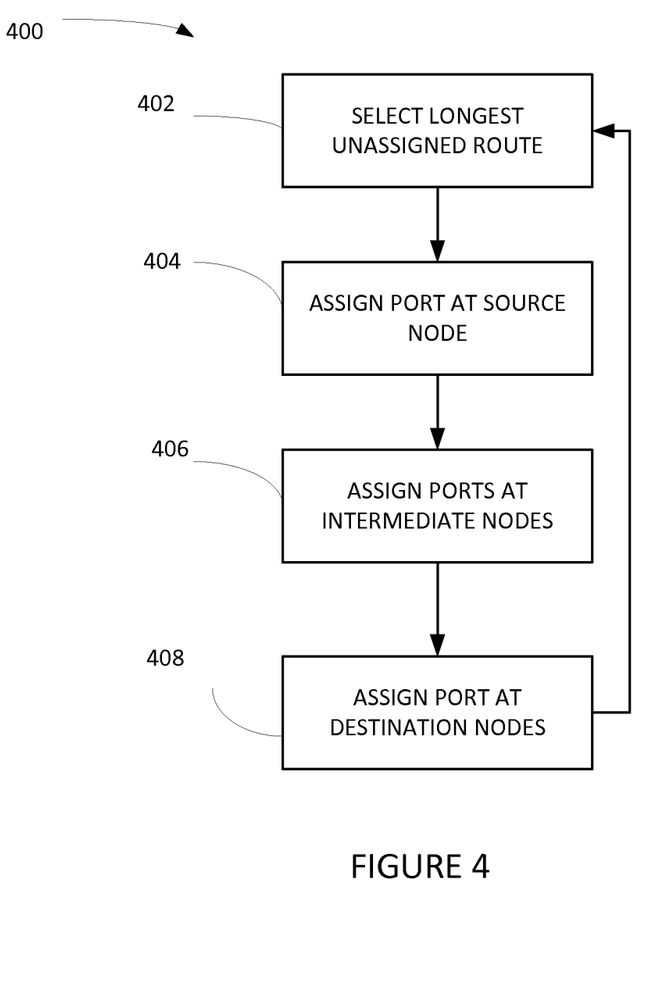
FIG. 4 is a flow diagram of an example method of assigning integer capacity routes to switches in a network.

FIG. 4 is a flow diagram of an example method of assigning integer capacity routes to switches in a network 400 (the switch assignment method 400). In brief overview, the method 400 includes selecting the longest route for which switch ports have not been assigned (stage 402), assigning a switch port at the source node of the selected route (stage 404), assigning switch ports at the intermediate nodes of the selected route (stage 406) and assigning a switch port at the destination node of the selected route (stage 408). The process continues with selecting the next longest route, and assigning switch ports to the route at each of the nodes it traverses. In some implementations, the switch assignment method is executed by the network configuration module 120 shown in FIG. 1.

As indicated above the switch assignment method 400 begins with the network configuration module 120 selecting the longest route in the routing matrix for which switch ports have not yet been assigned (stage 402). In general, the longer a route is (i.e., the more intermediate nodes or superblocks it must traverse), the more difficult it is to assign ingress and egress ports to single chips at the intermediate nodes along the route. Accordingly, in the implementation shown in FIG. 4, the network configuration module 120 assigns ports to the longest routes first, while the degree of freedom to assign routes to ports is greatest, as fewer ports have already been assigned. In some implementations, ties between routes having the same length are broken by the values of the priority parameters, if any, included in the routing matrix. In some other implementations, the order in which ports are assigned to routes of the same length is determined randomly or according to any other suitable selection process.

After a route is selected, the network configuration module 120 assigns a port on a top-tier switch associated with the source node of the selected route (stage 404). In general, for a given route, only single switch ports need to be assigned to the source and destination nodes of the route. At intermediate nodes, two nodes are assigned to a route, one to serve as an ingress and one to serve as an egress. To preserve the number of chips that can provide both ingress and egress ports to routes, it is advantageous, at the source of a route, to assign the route a port on a chip that includes an odd number of unassigned ports. If there are no chips available at the source node having an odd number of unassigned ports, the route can be assigned a port on a chip with an even number of free ports.

The network configuration module 120 assigns the route ports on chips at each intermediate node along the route (stage 406). For similar reasons to why the network configuration module 120 first attempts to assign a port at a source node of a route on a chip with an odd number of available ports, for an intermediate node of a route, the network configuration module 120 first attempts to assign the route two ports on chip having an even number of available ports. If no such chips exist at that time the ports are being assigned, the network configuration module 120 attempts to assign the route ports on a chip having three or more available ports, thereby avoiding having to assign the ingress and egress ports to different chips. If no chips are available having three or more available ports, the network configuration module 120 assigns the route an ingress port on a first chip having a single unassigned port and an egress port on a second chip having a single unassigned port.

The network configuration module 120 then assigns the route a port on a chip at its destination node (stage 408). In a similar fashion to the assignment of a port at the source node, the network configuration module 120 first attempts to assign the route a port on a chip having an odd number of unassigned ports. In some implementations, assigned routes are bidirectional. Therefore assigning a port from a source node S to a destination node D simultaneously assigns ports to routes having the node D as a source and the node S as the destination. To the extent that the routing matrix indicates that the bandwidth demands of these opposing routes differ, additional unused bandwidth can be assigned during the slack routing stage described further below.

After a full compliment of ports are assigned to a route, the network configuration module 120 selects a next route for which to assign ports (stage 402). In some implementations, if the demand matrix indicates that a particular route demands bandwidth equal to more than twice the capacity than a single physical connection can provide, the network configuration module 120 considers each integer multiple of the physical capacity a separate route. In some such implementations, if, after assigning ports to a first of such integer capacity routes, there are other routes having the same length for which ports still need to be assigned, the network configuration module 120 assigns ports to such other routes before assigning ports to another integer capacity route including the same set of nodes.

It should be noted that during the switch assignment method 400, routes are assigned individual ports on chips, primarily to facilitate tracking how many ports on each chip remain available. In the end, only the chip-route pairing is important for providing an efficient topology. Exactly which port on a given chip one end of a physical connection couples to does not, in most implementations, materially impact the efficiency of the network so long as the physical connection is coupled to a port on the appropriate chip. In some implementations, the routes can be assigned to chips instead of ports. In such implementations, the network configuration module 120 maintains a counter for each chip indicating how many ports remain available for that chip.

Figure 5A:
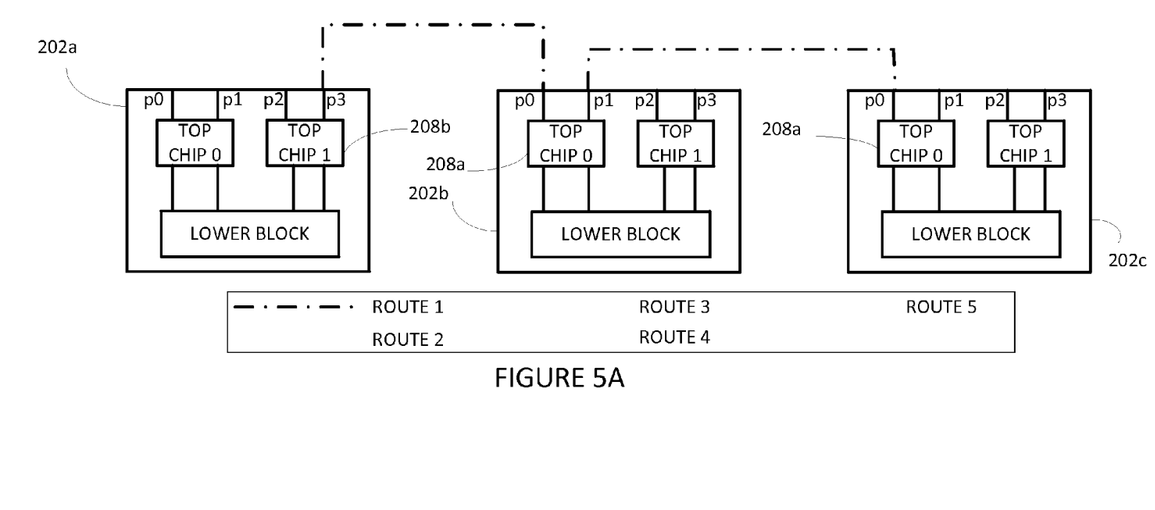
FIGS. 5A-5D shows several stages of the execution of the switch assignment method shown in FIG. 4.

FIGS. 5A-5D shows several stages of the execution of the switch assignment method 400 shown in FIG. 4. More particularly, FIGS. 5A-5D show the stages of processing that led to the physical topology shown in FIG. 2B using the switch assignment method 400. In each Figure, newly assigned physical connections are shown in a heavier weight than physical connections assigned in prior iterations of the switch assignment method 400. FIG. 5A shows the assignment of ports to the longest route, Route 1, included in the topology 200b. Route 1 is the only route supported by the network topology 200b that includes more than one hop. Route 1 begins at the first superblock 202a (the source node), and passes through the second superblock 202b (an intermediate node) on the way to the third superblock 202c (the destination node). The other routes are all single-hop or direct routes.

In assigning ports to Route 1, as there were no chips at the source node with an odd number of free ports, the network configuration module 120 assigns Route 1 a port on a chip having an even number of available ports, namely top chip 1 208b. For the intermediate node, the network configuration module 120 assigns Route 1 two ports on top chip 0 208a, which has an even number, i.e. 2, available ports. Route 1 is assigned port p0 at the third superblock 208c.

Figure 5B:
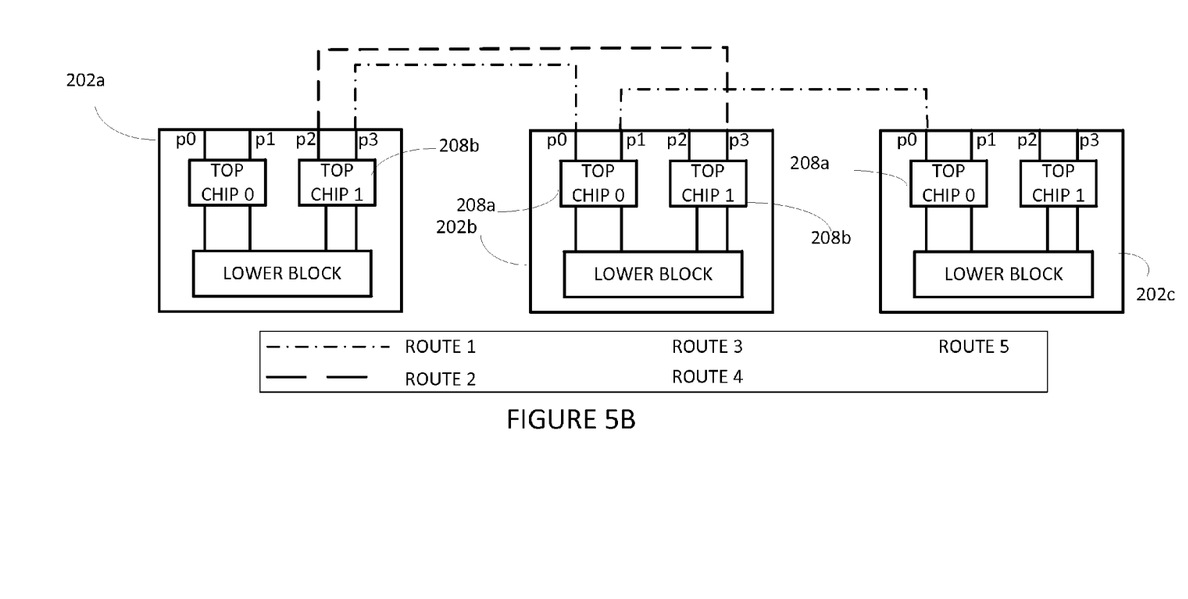

FIG. 5B shows the assignment of ports to a second route, Route 2, according to the switch assignment method 400. First, the network configuration module 120 assigns Route 2 a port at its source node (the first superblock 202a) on a switch with an odd number of free ports, i.e. top chip 1 208b. As Route 2 is a single hop route, (i.e., the route directly connects a source node to a destination node) it lacks any intermediate nodes requiring a port assignment. At its destination node (the second superblock 202b), Route 2 is assigned a port p3 on the only switch having any free ports available for assignment.

Figure 5C:
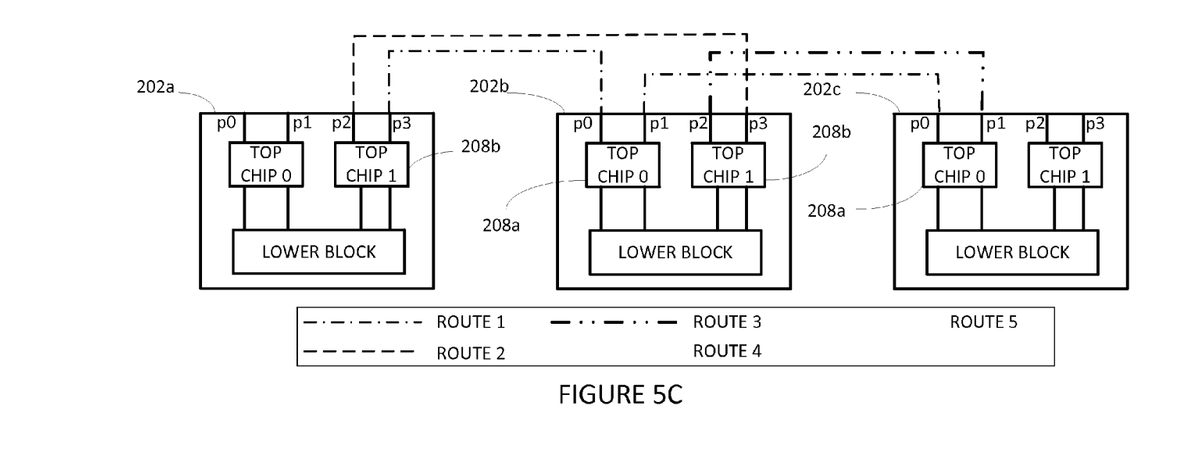

FIG. 5C shows the assignment of ports to Route 3. For Route 3's source, the network configuration module 120 assigns Route 3 a port on top chip 1 208b of the second superblock 202b, as top chip 1 208b has an odd number of available ports. Similarly, at the destination node of Route 3, the third superblock 202c, the network configuration module 120 assigns Route 3 a port on top chip 0, which also has an odd number of available ports.

Figure 5D:
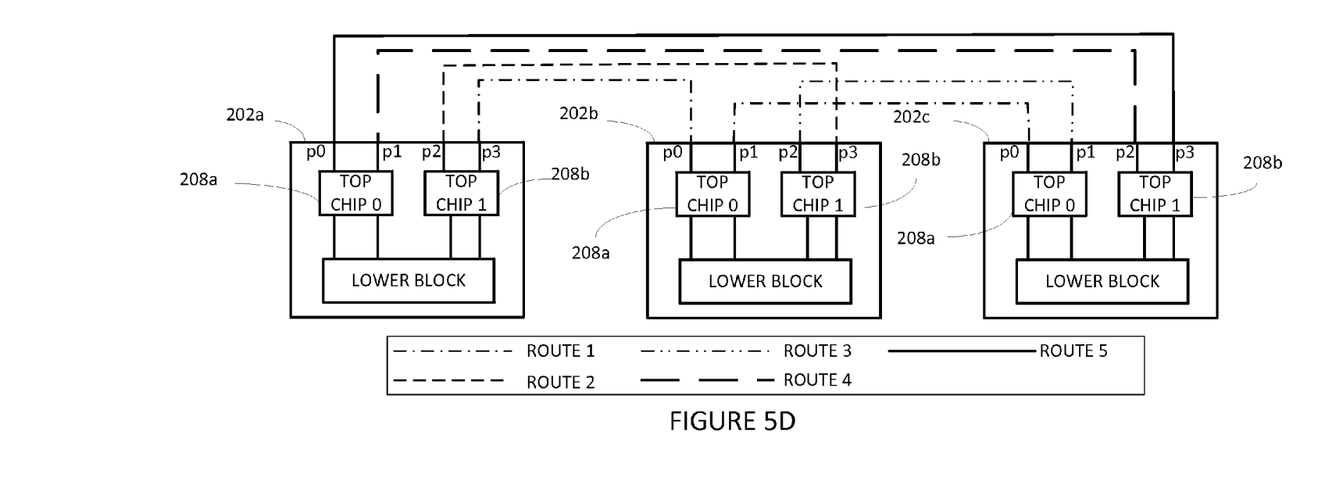

FIG. 5D shows the assignment of the two remaining routes, Routes 4 and 5. Both routes are single hop routes from the first super block 202a to the third superblock 202c. Routes 4 and 5 therefore may be considered to be two separate integer capacity routes associated with the same route. That is, the routing matrix received by the network configuration module 120 may not actually identify Routes 4 and 5 as separate routes. Instead, it may identify a single one-hop route between the first superblock 202a and the third superblock 202c having a bandwidth demand which is twice the capacity of a single physical connection between the first and third superblocks 202a and 202c.

Referring back to FIGS. 3 and 4, after the integer capacity routes are assigned (stage 304) according to the switch assignment method 400, the network configuration module 120 assigns switches to any remaining slack routes (stage 306). A "slack route" refers to a route that demands less than the full bandwidth of a physical connection. Accordingly, more than one slack route can share a physical connection without exceeding its bandwidth, which could introduce undesirable bottlenecks or delays in the network.

In some implementations, the network configuration module 120 assigns ports to slack routes in a similar fashion as it assigned integer capacity routes. That is, the network configuration module 120 assigns ports to the slack routes beginning with the longer (i.e., including the most number of network hops) slack routes before it assigns ports to shorter slack routes. For the source and destination nodes of each route, the network configuration module 120 attempts to assign the route a switch port on a top tier chip that includes an odd number of ports having sufficient available bandwidth to handle the route. For intermediate nodes, the network configuration module 120 first attempts to assign the route to a top tier chip having an even number of ports available that have sufficient bandwidth to accommodate the flow.

In some implementations, routes are assigned according to a first-fit approach. In some other implementations, the network configuration module 120 assigns the route to a port on a switch having the least available capacity sufficient to satisfy the demands of the route. Doing so helps preserve increased bandwidth on other ports, making it more likely that the demands of shorter (and thus later addressed) routes with higher capacity will still be able to be accommodated by a single port (at a source or destination node) or pair of ports (at intermediate nodes). In some other implementations, the slack routes with the highest bandwidth demands are assigned ports first, to make it more likely that such routes are given port assignments on a single chip at each node on their respective routes.

Implementations of the subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, i.e., one or more modules of computer program instructions, encoded on one or more computer storage media for execution by, or to control the operation of, data processing apparatus.

A computer readable medium can be, or be included in, a computer-readable storage device, a computer-readable storage substrate, a random or serial access memory array or device, or a combination of one or more of them. Moreover, while a computer readable medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer readable medium is tangible and non-transitory.

The operations described in this specification can be performed by a data processing apparatus on data stored on one or more computer-readable storage devices or received from other sources. The term "data processing apparatus" or "computing device" encompasses all kinds of apparatus, devices, and machines for processing data, including by way of example a programmable processor, a computer, a system on a chip, or multiple ones, or combinations of the foregoing The apparatus can include special purpose logic circuitry, e.g., an FPGA (field programmable gate array) or an ASIC. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated in a single product or packaged into multiple products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A computer-implemented system for determining a physical topology of a network, the system comprising:
a plurality of network nodes, each of the plurality of nodes including a multi-chip higher-tier switch, each of the multi-chip higher-tier switches including a plurality of switching chips, and each of the chips having a plurality of ports; and
a network configuration module configured to assign physical connections to respective ports of chips of the higher-tier switches of the nodes by iteratively:
selecting a first route of a plurality of routes, wherein the selected route includes a source node, at least one intermediate node, and a destination node;
for each of the source node, the intermediate node, and the destination node:
determining, for each chip of the respective node, whether the chip has an odd number of available ports or an even number of available ports, wherein a port is available if a physical connection has not yet been assigned to the port;
for the source node, assigning, for the selected route, a first port on a first chip, responsive to a determination that the first chip has an odd number of available ports;
for the at least one intermediate node, assigning, for the selected route, second and third ports on a second chip, responsive to a determination that the second chip has an even number of available ports; and
for the destination node, assigning, for the selected route, a fourth port on a third chip, responsive to a determination that the third chip has an odd number of available ports.

2. The system of claim 1, wherein the network configuration module is further configured to output a switch assignment file indicating correspondences between physical links between the nodes and chips at the respective nodes.

3. The system of claim 1, wherein selecting the first route comprises selecting a route having a bandwidth demand of at least a full bandwidth of a physical link between the nodes.

4. The system of claim 3, wherein the network configuration module is further configured to select a second route of the plurality of routes having a bandwidth demand that is less than a full bandwidth of physical link between the nodes, and to assign the second route a port on a switch previously assigned to a third route having a bandwidth demand that is less than a full bandwidth of physical link.

5. The system of claim 1, wherein the network configuration module is configured to assign the ports on a first-fit basis.

6. The system of claim 1, wherein selecting the first route comprises selecting a longest route of the plurality of routes.

7. The system of claim 1, wherein selecting the first route comprises selecting one of a plurality of equally long routes based on values of a priority parameter associated with each of the respective equally long routes.

8. The system of claim 1, wherein the network comprises a data center network.

9. The system of claim 8, wherein each of the nodes comprises a switch in a top-tier switching layer of a data center superblock.

10. A computer-implemented method for determining a physical topology of a network that includes a plurality of network nodes, each including a multi-chip higher-tier switch, each of the multi-chip higher-tier switches including a plurality of switching chips, and each of the chips having a plurality of ports, the method comprising:

assigning physical connections to respective ports of chips of the higher-tier switches of the nodes by iteratively:

selecting a first route of a plurality of routes, wherein the selected route includes a source node, at least one intermediate node, and a destination node;

for each of the source node, the intermediate node, and the destination node:

determining, for each chip of the respective node, whether the chip has an odd number of available ports or an even number of available ports, wherein a port is available if a physical connection has not yet been assigned to the port;

for the source node, assigning, for the selected route, a first port on a first chip, responsive to a determination that the first chip has an odd number of available ports;

for the at least one intermediate node, assigning, for the selected route, second and third ports on a second chip, responsive to a determination that the second chip has an even number of free available ports; and for the destination node, assigning, for the selected route, a fourth port on a third chip, responsive to a determination that the third chip has an odd number of available ports.

11. The method of claim 10, further comprising outputting a switch assignment file indicating correspondences between physical links between the nodes and chips at the respective nodes.

12. The method of claim 10, wherein selecting the first route comprises selecting a longest route of the plurality of routes.

13. The method of claim 10, wherein the network nodes are in a network comprising a data center network.

14. The method of claim 10, wherein each of the nodes comprises a switch in a top-tier switching layer of a data center superblock.

15. The method of claim 10, wherein selecting the first route comprises selecting one of a plurality of equally long routes based on values of a priority parameter associated with each of the respective equally long routes.

16. A non-transitory computer-readable storage medium having instructions stored thereon which, when executed by a processor, cause the processor to carry out a set of operations for determining a physical topology of a network that includes a plurality of network nodes, each including a multi-chip higher-tier switch, each of the multi-chip higher-tier switches including a plurality of switching chips, and each of the chips having a plurality of ports, the operations comprising:

assigning physical connections to respective ports of chips of the higher-tier switches of the nodes by iteratively:

selecting a route of a plurality of routes, wherein the selected route includes a source node, at least one intermediate node, and a destination node;

for each of the source node, the intermediate node, and the destination node:

determining, for each chip of the respective node, whether the chip has an odd number of available ports or an even number of available ports, wherein a port is available if a physical connection has not yet been assigned to the port; for the source node, assigning, for the selected route, a first port on a first chip, responsive to a determination that the first chip has an odd number of free available ports;

for the at least one intermediate node, assigning, for the selected route, second and third ports on a second chip, responsive to a determination that the second chip has an even number of free available ports; and for the destination node, assigning, for the selected route, a fourth port on a third chip, responsive to a determination that the third chip has an odd number of free available ports.

17. The non-transitory computer-readable storage medium of claim 16, comprising instructions for causing the processor to output a switch assignment file indicating correspondences between physical links between the nodes and chips at the respective nodes.

18. The non-transitory computer-readable storage medium of claim 16, wherein selecting the first route comprises selecting a longest route of the plurality of routes.

19. The non-transitory computer-readable storage medium of claim 16, wherein the network nodes are in a network comprising a data center network.

20. The non-transitory computer-readable storage medium of claim 16, wherein each of the nodes comprises a switch in a top-tier switching layer of a data center superblock.

* * * * *